(12) United States Patent
Lau et al.

(10) Patent No.: US 12,252,841 B2
(45) Date of Patent: Mar. 18, 2025

(54) DURABLE ANTIMICROBIAL TREATMENT OF TEXTILE FOR USE IN HEALTHCARE ENVIRONMENT

(71) Applicant: AVALON POLYMILLS (HK) LIMITED, Shatin NT (CN)

(72) Inventors: Johnson Yiu-Nam Lau, Houston, TX (US); Denise So Bik Chan, Hong Kong (CN); Jiachi Chiou, Hong Kong (CN); Chi Wai Kan, Hong Kong (CN); Kim Hung Lam, Hong Kong (CN); Wai Han Lam, Hong Kong (CN); Ka Fu Yung, Hong Kong (CN)

(73) Assignee: Avalon Polymills (HK) Limited, Hong Kong (CN)

( * ) Notice: Subject to any disclaimer, the term of this patent is extended or adjusted under 35 U.S.C. 154(b) by 1141 days.

(21) Appl. No.: 17/045,659

(22) PCT Filed: Apr. 4, 2019

(86) PCT No.: PCT/US2019/025887
§ 371 (c)(1),
(2) Date: Oct. 6, 2020

(87) PCT Pub. No.: WO2019/195616
PCT Pub. Date: Oct. 10, 2019

(65) Prior Publication Data
US 2021/0156080 A1 May 27, 2021

Related U.S. Application Data

(60) Provisional application No. 62/654,193, filed on Apr. 6, 2018.

(51) Int. Cl.
*D06M 16/00* (2006.01)
*A01N 25/02* (2006.01)
(Continued)

(52) U.S. Cl.
CPC .............. *D06M 16/00* (2013.01); *A01N 25/02* (2013.01); *A01N 25/34* (2013.01); *A01N 33/12* (2013.01);
(Continued)

(58) Field of Classification Search
None
See application file for complete search history.

(56) References Cited

U.S. PATENT DOCUMENTS 8,343,522 B2   1/2013   Pohl et al.
9,708,757 B2   7/2017   Viladot Petit et al.
(Continued)

FOREIGN PATENT DOCUMENTS

CN   105002729   10/2015
CN   105401430   12/2015
(Continued)

OTHER PUBLICATIONS https://patents.google.com/patent/KR20110123595A/en?oq=kr20110123595 (Year: 2010).*
(Continued)

*Primary Examiner* — Arti Singh-Pandey
(74) *Attorney, Agent, or Firm* — Loeb & Loeb LLP

(57) ABSTRACT

Compositions and methods are described that provide cellulosic and non-cellulosic fabrics with durable antimicrobial properties. Application of a coating that includes polyhexamethylene biguanide, polyethylene glycol, and a binder to a fabric followed by drying and curing was found to provide antimicrobial properties that are retained through over 100 washings under aggressive hospital washing conditions. In addition, tactile properties and tear resistance of the treated fabrics are maintained or improved.

9 Claims, 1 Drawing Sheet

(51) Int. Cl.
  *A01N 25/34*   (2006.01)
  *A01N 33/12*   (2006.01)
  *A01N 47/44*   (2006.01)
  *D06M 10/10*   (2006.01)
  *D06M 13/477*  (2006.01)
  *D06M 15/00*   (2006.01)
  *D06M 101/06*  (2006.01)

(52) U.S. Cl.
  CPC ............ *A01N 47/44* (2013.01); *D06M 10/10* (2013.01); *D06M 13/477* (2013.01); *D06M 15/00* (2013.01); *D06M 2101/06* (2013.01); *D06M 2200/50* (2013.01); *D10B 2401/13* (2013.01); *D10B 2509/00* (2013.01); *Y10T 442/2525* (2015.04)

(56) References Cited

U.S. PATENT DOCUMENTS

| | | | |
|---|---|---|---|
| 2010/0210725 | A1 | 8/2010 | Riquet et al. |
| 2011/0250253 | A1 | 10/2011 | Cunkle |
| 2012/0258157 | A1 | 8/2012 | Koltzenburg et al. |
| 2014/0142281 | A1 | 5/2014 | Son et al. |
| 2015/0004197 | A1 | 1/2015 | Doerr et al. |
| 2017/0000115 | A1 | 1/2017 | Nassar et al. |
| 2023/0407559 | A1* | 12/2023 | Lau .................... D06M 13/513 |

FOREIGN PATENT DOCUMENTS

| | | |
|---|---|---|
| CN | 105755614 | 7/2016 |
| CN | 107558193 | 1/2018 |
| CN | 105104430 | 8/2018 |
| JP | H08226077 | 9/1996 |
| JP | 2005139561 | 6/2005 |
| JP | 2005314823 | 11/2005 |
| JP | 2003105674 | 7/2006 |
| JP | 2012211428 | 11/2012 |
| JP | 5864594 | 2/2016 |
| KR | 101302488 B1 | 9/2013 |
| KR | 20110123595 | 9/2013 |
| WO | 2013047642 | 3/2015 |

OTHER PUBLICATIONS https://patents.google.com/patent/KR910007892B1/en?oq=17045659 (Year: 2000).*
"Guidelines for Environmental Infection Control in Health-Care Facilities", U.S. Department of Health and Human Services Centers for Disease Control and Prevention. 241 pages.
"Report on the Burden of Endemic Health Care-Associated Infection Worldwide," WHO. 40 pages.
Extended European Search Report dated Jan. 4, 2022, from related EP application No. 19781571.5. 73 pages.
McDonnell, et al. "Antiseptics and Disinfectants: Activity, Action, and Resistance," Clinical Microbiology Reviews, Jan. 1999, p. 147-179. 33 pages.
Mitchell, et al. "Role of healthcare apparel and other healthcare textiles in the transmission of pathogens: a review of the literature," Journal of Hospital Infection 90 (2015) 285-292. 9 pages.
Abdullah, et al. "Effect of repeated laundering on durability and bacterial activity of some antibacterial finishes," National Institute for Biotechnology and Genetic Engineering, 2013. 7 pages.
Fijan, et al. "Implementing hygiene monitoring systems in hospital laundries in order to reduce microbial contamination of hospital textiles," Journal of Hospital Infection (2005) 61, 30-38. 10 pages.
Chen-Yu JH, Eberhardt DM, Kincade DH. Antibacterial and laundering properties of AMS and PHMB as finishing agents on fabric for health care workers' uniforms. Clothing and Textiles Research Journal. 2007;25:258-272.
International Search Report dated Jul. 19, 2019, for related PCT Application No. PCT/US2019/025887, 14 pages.
Search Report for Singaporean Patent Application No. 11202114354P, dated Feb. 8, 2024, 2 pages.
Written Opinion regarding Singaporean Patent Application No. 11202114354P, dated Feb. 16, 2024, 6 pages.

* cited by examiner

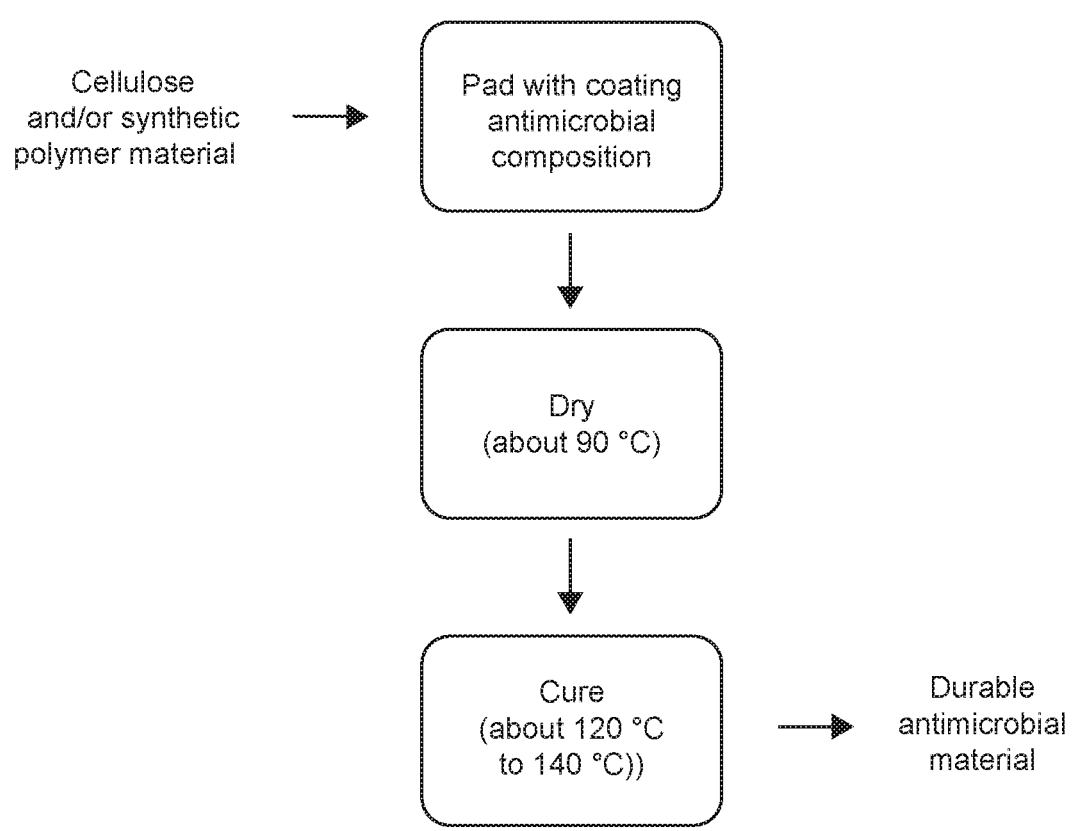

DURABLE ANTIMICROBIAL TREATMENT OF TEXTILE FOR USE IN HEALTHCARE ENVIRONMENT

This application claims the benefit of U.S. Provisional Application No. 62/654,193 filed on Apr. 6, 2018. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is textiles with durable antimicrobial properties.

BACKGROUND

The following description includes information that may be useful in understanding the present invention. It is not an admission that any of the information provided herein is prior art or relevant to the presently claimed invention, or that any publication specifically or implicitly referenced is prior art.

The background description includes information that may be useful in understanding the present invention. It is not an admission that any of the information provided herein is prior art or relevant to the presently claimed invention, or that any publication specifically or implicitly referenced is prior art.

Hundreds of millions of patients are infected by healthcare-associated infections (HAIs) worldwide each year while receiving medical care, leading to significant mortality and financial losses for health systems. According to World Health Organization, of every 100 hospitalized patients at any given time, 7 in developed and 10 in developing countries will acquire at least one HAI. Annual financial losses because of the HAI are also substantial, and are estimated at about €7 billion in Europe including direct costs only and reflecting 16 million extra days of hospital stay, and at about US$6.5 billion in the USA (World Health Organization (WHO). Report on the burden of endemic health care-associated infection worldwide. Geneva: WHO; 2011). All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Textiles and apparels are frequently exposed to infectious microorganisms in healthcare areas and are thus liable to carry pathogenic microorganism, increasing the risk of HAIs (Mitchell A, Spencer, M, Edmiston, C. Role of healthcare apparel and other healthcare textiles in the transmission of pathogens: a review of the literature. Journal of Hospital Infection. 2015; 90:285-292). *Staphylococcus aureus* (gram-positive bacteria) and *Klebsiella pneumoniae* (gram-negative bacteria) are common pathogens causing hospitals and surgical infections. *Staphylococcus aureus* (SA) can cause boils, skin infections, pneumonia, and meningitis, especially in immunocompromised people. *Klebsiella pneumoniae* (KP) is the primary cause of pneumonia, septicemia, and urinary tract infections (Prescott L M, Harley J P, Klein D A. Microbiology (5th ed.). Boston: McGraw-Hill; 2002; Singleton, P. Bacteria in biology, biotechnology, and medicine (3rd ed.). New York: John Wiley & Sons; 1995).

Providing textiles utilized in hospital and healthcare environments with antimicrobial function can potentially prevent the spreading of HAI pathogens. This greatly benefits the patients, frontline medical workers, and healthcare providers. Among fabric products employed for apparel and textile goods in hospital, cotton fabrics (cellulose being the major component) have the majority market share due to their flexibility, wearing comfort, water absorptivity, and air permeability.

Poly(hexamethylene biguanide) (PHMB) is a cationic biguanide-based biocidal polymer that can be used to impart antimicrobial functionality to cellulosic textiles (Zhao T, Chen Q. Halogenated phenols and polybiguanides as antimicrobial textile finishes. Antimicrobial Textiles. 2016:141-153; Simoncic B, Tomsic B. Structures of novel antimicrobial agents for textiles—A review. Textile Research Journal. 2008; 80:1721-1737). When fabric treated with PHMB comes in contact with a bacterium the positively charged biguanide groups interact with the negatively charged bacterial cell surface, leading to increased fluidity and permeability of the membrane structure. This results in the leakage of intracellular materials from the outer membrane and eventually causes death of the microorganism (McDonnell G, Russell A D. Antiseptics and disinfectants: activity, action, and resistance. Clinical Microbiology Reviews. 1999; 12:147-179).

In 2001, the antimicrobial efficiency of PHMB treated cotton fabric was tested after different laundering cycles (Wallace M. Testing the efficacy of polyhexamethylene biguanide as an antimicrobial treatment for cotton fabric. AATCC Review. 2001; 1:18-20). The results showed that PHMB reduced *Staphylococcus aureus* by 98% after more than ten laundering cycles and had a greater than 99% reduction in *Klebsiella pneumoniae* after five laundering cycles. It was also reported that PHMB treated cotton blend fabric consistently exhibited reductions of more than 99% of *Staphylococcus aureus* and about 94% of *Klebsiella pneumoniae* after twenty five conventional laundering cycles (Chen-Yu J H, Eberhardt D M, Kincade D H. Antibacterial and laundering properties of AMS and PHMB as finishing agents on fabric for health care workers' uniforms. Clothing and Textiles Research Journal. 2007; 25:258-272). However, it should be noted that the washing carried out in hospitals is generally aggressive and is conducted under more stringent conditions (e.g. higher temperatures) than conventional laundering in order to provide adequate levels of hygiene (Sehulster L M, Chinn R Y W, Arduino M J, Carpenter J, Donlan R, Ashford D, Besser R, Fields B, McNeil M M, Whitney C, Wong S, Juranek D, Cleveland J. Guidelines for environmental infection control in health-care facilities. Recommendations from CDC and the Healthcare Infection Control Practices Advisory Committee (HICPAC). American Society for Healthcare Engineering/American Hospital Association: Chicago, IL, USA, 2004; Fijan S, Šostar-Turk S, Cencič A. Implementing hygiene monitoring systems in hospital laundries in order to reduce microbial contamination of hospital textiles. Journal of Hospital Infection. 2005; 61:30-38).

The wash durability of the antimicrobial functions subjected to repeated aggressive laundering is problematic among current PHMB-treated antimicrobial textiles. Unfortunately, PHMB applied using conventional methods is eventually removed by washing, diminishing the antimicrobial effects (Abdullah I, Gilani S, Mubeen F. Effect of repeated laundering on durability and bactericidal activity of some antibacterial finishes. Pakistan Journal of Scientific and Industrial Research Series A: Physical Sciences. 2014; 57:47-52).

Thus, there is still a need for a treatment for fabrics that provides an effective and durable anti-microbial activity upon repeated aggressive launderings in order to efficiently and sustainably eliminate surface-bound pathogenic microbes.

SUMMARY OF THE INVENTION

The inventive subject matter provides compositions and methods for providing durable antimicrobial materials that retain antimicrobial properties for at least 104 aggressive wash cycles. Such materials include cellulosic products, such as papers, tissues, dressings, and/or textiles, as well as papers, tissues, dressings, and/or textiles made from synthetic polymers.

One embodiment of the inventive subject matter is a wash-durable antimicrobial textile and/or textile substrate suitable for use in healthcare and hospital environments. Such an antimicrobial and/or textile substrate includes an antimicrobial composition of a cationic biocide (e.g. polyhexamethylene biguanide (PHMB), polyaminopropyl biguanide (PAPB), quaternary ammonium salts, benzalkonium salts, chlorhexidine salts, cetylpyridinium salts, and/or cetyltrimethylammonium salts), a hydrophilic biocompatible polymer (e.g. polyethylene glycol (PEG), poly(N-isopropylacrylamide), polyacrylamide, poly(2-oxazoline), polyethylenimine, poly(acrylic acid), polymethacrylate, poly(ethylene oxide), poly(vinyl alcohol), and/or poly(vinylpyrrolidone)), and, in some embodiments, a binder. Such a textile and/or textile substrate can include cellulosic or synthetic polymer fibers, or can include a mixture of cellulosic and synthetic polymer fibers. The hydrophilic biocompatible polymer is selected to provide an antimicrobial effect as well as to facilitate penetration of the antimicrobial composition into the textile substrate. Suitable binders include a functional group compatible with covalent chemical bonding to the cationic biocide, the hydrophilic biocompatible polymer, and/or the textile substrate. At least a portion of the antimicrobial composition is chemically bonded to the to the textile substrate, and the resulting antimicrobial textile exhibits antibacterial, antiviral, and antifungal properties. The antibacterial property is effective against drug-sensitive and drug-resistant bacteria, whereas the antiviral property is effective against enveloped viruses (such as an influenza virus). The antimicrobial properties are maintained after at least 104 cycles of washing performed in accordance with a hospital protocol for hygienic washing (e.g. agitation at 65° C. with detergent and oxygen-based disinfectant for 10 minutes, or agitation at 75° C. with detergent for 5 minutes). Similarly, the antibacterial, antiviral, and antifungal properties are maintained following hot or dry pressing. In such an antimicrobial textile the antimicrobial composition can include 5% to 15% v/v polyhexamethylene biguanide, 5% to 10% v/v polyethylene glycol having a molecular weight of 300 Daltons to 1000 Daltons, and 3% to 8% v/v of a binder. The antimicrobial composition can be applied as coating on the textile substrate, for example using a pad-dry-cure method. In such a pad-cure-dry method the antimicrobial composition can be applied to the textile substrate by dipping and padding at ambient temperature until a wet pick-up of 70% to 80% is achieved, followed by drying at about 90° C. for 1 to 10 minutes and curing at about 120° C. to about 140° C. for about 30 seconds to 1 minute. Such a pad-cure-dry process can be readily practiced on an industrial scale. The tearing strength of the antimicrobial textile is increased relative to the textile substrate, whereas the tactile properties including resilience, softness and smoothness are maintained even after at least 50 washing cycles under stringent hospital washing conditions.

Another embodiment of the inventive concept is a method of providing a wash-durable antimicrobial textile and/or textile substrate. This is accomplished by obtaining a textile or textile substrate, contacting the textile and/or textile substrate with an antimicrobial composition (which includes cationic biocide, a hydrophilic biocompatible polymer, and a binder), allowing the antimicrobial composition to dry to generate a treated textile substrate, and curing the treated textile substrate. The textile substrate can include cellulosic or synthetic polymer fibers. The hydrophilic biocompatible polymer is selected to provide an antimicrobial effect as well as to facilitate penetration of the antimicrobial composition into the textile substrate. Suitable binders include a functional group compatible with covalent chemical bonding to the cationic biocide, the hydrophilic biocompatible polymer, and/or the textile substrate. At least a portion of the antimicrobial composition is chemically bonded to the to the textile substrate, and the resulting antimicrobial textile exhibits antibacterial, antiviral, and antifungal properties. The antibacterial property is effective against drug-resistant bacteria and the antiviral property is effective against enveloped viruses (such as an influenza virus). The antimicrobial properties are maintained after at least 104 cycles of washing performed in accordance with a hospital protocol for hygienic washing (e.g. agitation at 65° C. with detergent and oxygen-based disinfectant for 10 minutes, or agitation at 75° C. with detergent for 5 minutes). Similarly, the antibacterial, antiviral, and antifungal properties are maintained following hot or dry pressing. In such an antimicrobial textile the antimicrobial composition can include 5% to 15% v/v polyhexamethylene biguanide, 5% to 10% v/v polyethylene glycol having a molecular weight of 300 Daltons to 1000 Daltons, and 3% to 8% v/v of a binder. The antimicrobial composition can be applied as coating on the textile substrate, for example using a pad-dry-cure method. In such a pad-cure-dry method the antimicrobial composition can be applied to the textile substrate by dipping and padding at ambient temperature until a wet pick-up of 70% to 80% is achieved, followed by drying at about 90° C. for 1 to 10 minutes and curing at about 120° C. to about 140° C. for about 30 seconds to 1 minute. Such a pad-cure-dry process can be readily practiced on an industrial scale. The tearing strength of the antimicrobial textile is increased relative to the textile substrate, whereas the tactile properties including resilience, softness and smoothness are maintained even after at least 50 washing cycles under stringent hospital washing conditions.

Another embodiment of the inventive concept is an article of clothing having anti-microbial properties. Such an article of clothing is made, at least in part, from a textile that includes a cellulosic or synthetic polymer fiber coated with an antimicrobial composition (such as a cationic biocide, a hydrophilic biocompatible polymer, and a binder). At least a portion of the antimicrobial composition is chemically bonded to the textile, and the resulting article of clothing exhibits antibacterial, antiviral, and antifungal properties. Suitable articles of clothing include shoes, slippers, stockings, underwear, cloth diapers, support garments, pants, dresses, skirts, shirts, laboratory or medical practitioner's coats, pajamas, hats, headscarves, and/or gloves. Such articles of clothing can include indicia signifying that the article of clothing has antimicrobial properties. The textile can include cellulosic or synthetic polymer fibers. The hydrophilic biocompatible polymer is selected to provide an antimicrobial effect as well as to facilitate penetration of the antimicrobial composition into the textile substrate. Suitable binders include a functional group compatible with covalent chemical bonding to the cationic biocide, the hydrophilic biocompatible polymer, and/or the textile substrate. At least a portion of the antimicrobial composition is chemically bonded to the textile, and the resulting antimicrobial article of clothing exhibits antibacterial, antiviral, and antifungal properties. The antibacterial property is effective against drug-resistant bacteria and the antiviral property is effective against enveloped viruses (such as an influenza virus). The antimicrobial properties are maintained after at least 104 cycles of washing performed in accordance with a hospital protocol for hygienic washing (e.g. agitation at 65° C. with detergent and oxygen-based disinfectant for 10 minutes, or agitation at 75° C. with detergent for 5 minutes). Similarly, the antibacterial, antiviral, and antifungal properties are maintained following hot or dry pressing. The antimicrobial composition can include 5% to 15% v/v polyhexamethylene biguanide, 5% to 10% v/v polyethylene glycol having a molecular weight of 300 Daltons to 1000 Daltons, and 3% to 8% v/v of a binder. The antimicrobial composition can be applied as coating on the textile, for example using a pad-dry-cure method. In such a pad-cure-dry method the antimicrobial composition can be applied to the textile by dipping and padding at ambient temperature until a wet pick-up of 70% to 80% is achieved, followed by drying at about 90° C. for 1 to 10 minutes and curing at about 120° C. to about 140° C. for about 30 seconds to 1 minute.

Various objects, features, aspects and advantages of the inventive subject matter will become more apparent from the following detailed description of preferred embodiments, along with the accompanying drawing FIGURES in which like numerals represent like components.

BRIEF DESCRIPTION OF THE DRAWINGS

FIG. 1 schematically depicts an exemplary process for application of an antimicrobial coating composition of the inventive concept onto materials having cellulosic and/or synthetic polymer fibers to produce a durable, antimicrobial material.

DETAILED DESCRIPTION

The following description includes information that may be useful in understanding the present invention. It is not an admission that any of the information provided herein is prior art or relevant to the presently claimed invention, or that any publication specifically or implicitly referenced is prior art.

The inventive subject matter provides compositions and methods that provide a treatment for textiles which confers durable antimicrobial properties and is suitable for widespread use in healthcare and hospital environment. Suitable compositions can include a cationic biocide (such as polyhexamethylene biguanide (PHMB), polyaminopropyl biguanide (PAPB), a quaternary ammonium salt, a benzalkonium salt, a chlorhexidine salt, a cetylpyridinium salt, and/or a cetyltrimethylammonium salt) and a hydrophilic biocompatible polymer (such as polyethylene glycol (PEG), poly(N-isopropylacrylamide), polyacrylamide, poly(2-oxazoline), polyethylenimine, poly(acrylic acid), polymethacrylate, poly(ethylene oxide), poly(vinyl alcohol), and/or poly(vinylpyrrolidone)), which have surprisingly been found to be effective in combination to provide a highly durable fabric treatment that eliminates a broad spectrum of pathogens, including drug-resistant bacteria and enveloped viruses, by multiple antimicrobial mechanisms. Such compositions and treatments have also unexpectedly been found to improve tearing strength, resilience, softness, and smoothness of the treated textiles. These improvements are sustained through multiple (e.g. 50 or more) washings performed under stringent hospital conditions.

In some embodiments a binder is included for application onto various cellulose materials via a pad-dry-cure process. Surprisingly the antibacterial, antiviral and antifungal properties of textiles treated with such a composition can be maintained even after 104 cycles of aggressive laundering under stringent hospital washing conditions. In addition, the tearing strength, resilience, softness and smoothness of the antimicrobial textile are improved (e.g. increased) or maintained.

Various objects, features, aspects and advantages of the inventive subject matter will become more apparent from the following detailed description of preferred embodiments. In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One should appreciate that the disclosed techniques provide many advantageous technical effects including providing textiles and other cellulosic materials that can reduce the transmission of pathogenic bacteria and viruses, particularly in a hospital or other clinical setting, thereby improving patient outcomes.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Compositions of the inventive subject matter are useful for providing an antimicrobial textile which is suitable for repeated laundering under hospital washing conditions. Such compositions can be applied to cellulosic textiles and to other cellulosic materials, as well as textiles made from synthetic polymers and mixtures of synthetic polymers and cellulosic materials. Such textiles can be in any suitable form, such as filters, wipes, absorbent pads, wound dressings, articles of clothing, bedclothes, towels, etc.

One embodiment of the inventive concept is a coating composition that includes polyhexamethylene biguanide (PHMB) in solution in combination with polyethylene glycol (PEG). PHMB can be present in concentrations ranging from 1% to 99%, 5% to 90%, 10% to 70%, about 10%, about 20%, about 30%, about 40%, and/or less than about 50% (w/v). The PEG used can have a molecular weight ranging from about 300 to about 10,000 Daltons. Suitable solvents include aqueous solvents (e.g. water, buffered aqueous solutions), suitable organic solvents (e.g. methanol, ethanol, isopropyl alcohol, acetone, DMSO, other water-miscible solvents, and mixtures thereof). In a preferred embodiment the coating composition includes PHMB at about 20% w/v and PEG having a molecular weight of from about 300 Daltons to about 1,000 Daltons (e.g. PEG 300-PEG 1000) in aqueous solution.

Such an antimicrobial coating composition can include a binder or binder compound (e.g. a polyamine, a polyacrylate, and/or a polyurethane), and can be applied onto various cellulosic, synthetic polymer, or mixed cellulosic/synthetic polymer materials by any suitable process. Suitable processes include spraying, immersion, and padding of the coating liquid onto the cellulose material. Application of the coating composition can be followed by drying (for example, at ambient or elevated temperatures) in order to form an antimicrobial coating. In some embodiments such a drying step can be followed by a curing step, which can be performed at a temperature higher than that of the drying step. In a preferred embodiment the coating composition is applied using a pad-dry-cure process.

An example of a pad transfer-dry-cure process of the inventive concept is shown in FIG. 1. As shown, a suitable fabric or fibrous materials (e.g. one containing cellulosic and/or synthetic polymer fibers) can be coated with an antimicrobial coating composition of the inventive concept by pad transfer. Once a suitable level of coating saturation is achieved (e.g. about 70% to 80%) the material is dried. Drying can be accomplished at ambient (i.e. room) temperature or at an elevated temperature (e.g. about 90° C.). Drying is typically completed in from about 1 minute to about 10 minutes. The dried material is then cured by exposure to an elevated temperature (e.g. about 120° C. to about 140° C.) to provide a durable antimicrobial material of the inventive concept. The curing process typically requires from about 30 seconds to about 1 minute.

Treated fabrics obtained by application of the coating composition have antibacterial, antiviral, and/or antifungal properties. Membrane-targeted mechanism(s) of the antimicrobial composition provided herein can reduce or eliminate a broad spectrum of pathogens including drug-resistant bacteria and enveloped virus (including Influenza virus). More importantly and surprisingly, these properties are maintained through at least 104 cycles of accelerated launderings under stringent hospital washing conditions. It should be appreciated that each cycle under such conditions is equivalent to about five domestic or conventional commercial washes. Surprisingly, the mechanical property, such as tearing strength, is improved relative to the corresponding untreated fabrics, whereas the tactile properties, such as resilience, softness and smoothness, of the treated fabrics are maintained after about 50 or more washings under stringent hospital conditions.

Such durable antimicrobial textiles are highly suitable for widespread use in healthcare and hospital environments, and other environments where hygiene control is of supreme importance, such as hotels/resorts, cruise ships, daycare facilities, schools, board and care facilities, rehabilitation facilities, gymnasiums, prisons, and/or wherever contagion is a significant concern.

Any cellulose fabric, such as cotton fabric, or cellulosic material, such as paper, can be utilized as the substrate. Suitable fabrics can be knit, woven, or non-woven. Suitable antimicrobial coating compositions are aqueous solutions that can include from about 5% to 15% v/v of PHMB (as a 20% w/v solution of its hydrochloride salt), 5% to 10% v/v of PEG with an average molecular weight in the range of 300 to 1000 Daltons, and 3% to 8% v/v of a solution of a binder. Suitable binders include polyamines, polyacrylates, and/or polyurethanes.

Such a coating composition can be applied to a cellulosic fabric using a "pad-dry-cure" method. For example, a cellulosic fabric can be dipped into and/or padded with a coating composition of the inventive concept at room temperature until a wet pick-up of from about 70% to 80% is achieved. The treated fabric can then be dried at ambient temperature or at about 90° C. for from about 1 to 10 minutes, followed by curing at about 120° C. to about 140° C. for about 30 seconds to about 1 minute.

It should also be appreciated that non-cellulosic or polymer fabrics are also suitable for use in compositions and methods of the inventive concept. For example, textiles and/or surfaces that are made from or include polypropylene, polyethylene, polyvinylchloride, polystyrene, polyurethane, polyamide, and/or fluoroethylene polymers can be suitable substrates. Mixed fabrics or materials incorporating both cellulosic and polymeric fibers are also suitable for use in compositions and methods of the inventive concept. An antimicrobial composition of the inventive concept can be applied to such polymer fabrics by padding at ambient temperature, followed by drying at about 90° C. for from about 1 to 10 minutes.

It has been found that PHMB kills bacteria, fungi, parasites and certain viruses with a high therapeutic index (Muller G, Kramer, A. Biocompatibility index of antiseptic agents by parallel assessment of antimicrobial activity and cellular cytotoxicity. Journal of Antimicrobial Chemotherapy. 2008; 61: 1281-1287). The electrostatic attractions between the positively charged biguanide groups of PHMB and the negatively charged bacterial cell surface cause the disruption of the bacterial cell wall leading to cell death. It has also been reported that PEG 400, 600 and 1000 can have significant antibacterial activity against various pathogenic bacteria such as *Staphylococcus aureus* and *Klebsiella pneumoniae* (Chirife J, Herszage L, Joseph A, Bozzini J P, Leardini N, Kohn E S. In vitro antibacterial activity of concentrated polyethylene glycol 400 solutions. Antimicrobial Agents and Chemotherapy. 1983; 24: 409-412; Sójka-Ledakowicz J, Chruściel J J, Kudzin M H, Łatwińska J, Kiwala M. Antimicrobial Functionalization of textile materials with copper silicate. Fibres & Textiles in Eastern Europe. 2016; 24: 151-156; Nalawade T M, Bhat K, Sogi S H P. Bactericidal activity of propylene glycol, glycerin, polyethylene glycol 400, and polyethylene glycol 1000 against selected microorganisms. Journal of International Society of Preventive and Community Dentistry. 2015; 5: 114-119). It should also be appreciated that PEG can inhibit bacterial adhesion, for example to implant surfaces (Jinkins R S, Leonas K K. Influence of a polyethylene glycol treatment on surface, liquid barrier and antibacterial properties. Textile Chemist & Colorist. 1994; 26: 25-29). With the combined antimicrobial mechanisms of PHMB and PEG, the treated fabrics discussed herein provide a unique antimicrobial mechanism that is effective in killing a broad spectrum of pathogens, which is highly beneficial for hospital and healthcare facility use.

PHMB is thought to attach to the carboxyl groups of the cellulosic substrate (resulting from chemical finishing) via hydrogen bonding and electrostatic interactions (Blackburn R S, Harvey A, Kettle L L, Payne J D, Russell S J. Sorption of poly(hexamethylenebiguanide) on cellulose: mechanism of binding and molecular recognition. Langmuir. 1994; 26: 25-29). However, conventional PHMB-based agents can be abraded away under stringent washing conditions in the presence of detergents and oxidizing agents (e.g. bleach). In some embodiments polymer binders provided in coating formulations of the inventive concept serve to enhance wash durability through strong interactions with both the cellulose surface and the antimicrobial reagents. It should also be appreciated that PEG forms a net-like polymeric matrix that serves to couple the binder and PHMB to fibers of the coated fabric. Surprisingly (particularly in consideration of the high aqueous solubility of PEG), such a combination results in a sustained and effective antimicrobial activity of the treated fabric that remains through and after at least 104 repetitions of stringent hospital laundering cycles, as well as dry pressing.

Another embodiment of the inventive concept is an article of clothing incorporating a fabric treated with a combination of PHMB, PEG, and (optionally) a binder as described above. Such articles of clothing can be dimensioned for an adult, child, or infant. Such an article of clothing can be constructed in whole or in part from a cellulosic and/or polymeric fabric that has been treated previously. Alternatively, such an article of clothing can be prepared from conventional cellulosic and/or polymeric fabric followed by treatment of all or part of the article with a combination of PHMB, PEG, and (optionally) a binder. Suitable articles of clothing include shoes, slippers, stockings, underwear, cloth diapers, support garments, pants, dresses, skirts, men's and/or women's shirts, laboratory or medical practitioner's coats, pajamas or other nightclothes, hats, headscarves, and/or gloves. Such an article of clothing can include indicia of its antimicrobial character. Suitable indicia include a characteristic color, pattern, or design and/or a human or machine-readable label or tag.

Laundering Durability Evaluation: A laundering durability evaluation was carried out using accelerated laundering test under typical stringent hospital washing conditions (Laird K, Riley K. Chapter 13. Antimicrobial textiles for medical environments. Antimicrobial Textiles. (1st ed.). Cambridge: Woodhead Publishing; 2016). One accelerated laundering is generally considered to be equivalent to 5 cycles of domestic laundering (Laundering durable antibacterial cotton fabrics grafted with pomegranate-shaped polymer wrapped in silver nanoparticle aggregations. Scientific Reports. 2014; 4:5920).

The fabrics were washed in a rotating closed canister containing an aqueous washing solution in a thermostatically controlled water bath at given temperature operating at 40±2 rpm. Two conditions were utilized in the laundering tests:

The laundering test was performed at 65° C. with detergent (0.0065%, w/v) and an oxygen-based bleaching agent (300 ppm) for 10 minutes (Condition I)

The laundering test was performed at 75° C. with detergent (0.0065%, w/v) for 5 minutes (Condition II)

After laundering, fabric samples were stored under standard conditions at 20±2° C. temperature and 65±2% relative humidity for at least 24 hours prior to antimicrobial testing.

Dry Pressing: The dry pressing test was performed following procedures described in ISO 105-X11. The dry specimen was placed on top of the cotton cloth covering the wool flannel padding. The top plate of the heating device was lowered and the specimen was left for 15 seconds at 150° C. followed by antimicrobial testing.

Evaluation of Antibacterial Efficiency:

Quantitative testing was performed following procedures described in AATCC 100-2004 with slight modifications. Both *Klebsiella pneumoniae* and *Staphylococcus aureus* were grown in 5 mL of Tryptic Soy Broth (TSB) and incubated at 37° C. for 18 hours with shaking at 250 rpm. The $OD_{600}$ of the bacteria culture was measured using an optical density reader and adjusted to an $OD_{600}$ of 1.0. This time point was set as the "0 hour". The initial bacterial count at 0 hour was determined by diluting the bacteria $10^3$ to $10^7$-fold using a 0.9% saline solution. One hundred fifty μL of the appropriate bacterial dilution was removed and spread on Tryptic Soy Agar (TSA) plates. The average bacterial count was then determined to be in the range of $2 \times 10^8$ to $8 \times 10^8$ CFU/mL.

The fabric test specimen was cut into square samples each with an area of 1.5 $cm^2$, one of which was placed in each of a series of Petri dishes. The negative control was a fabric sample without antimicrobial coating and was made from the same base fabric as the treated samples. One hundred μL of the appropriate dilution of bacterial culture was then added to the fabric sample. When testing fabric samples at the 0-hour time point bacteria in the fabric samples were eluted immediately using 5 mL of a 0.9% saline solution. When testing fabric samples after 18 hours incubation the bacteria in the fabric samples were eluted as described above after incubating with the fabrics up to 18 hours in a moisture chamber at 37° C. One hundred fifty µL of the washed-out solution was taken and spread on a TSA plate and the plates were incubated at 37° C. for 18 hours. The colonies on each plate were counted and the colony forming unit per milliliter of bacteria (CFU/ml) was calculated. Only the colony numbers between 25-250 were used to calculate the CFU/ml.

The percentage reduction of bacteria (R) was calculated using $$R = \frac{B-A}{B} \times 100$$

where A=number of bacteria recovered from treated specimen after 18 hours; B=number of bacteria recovered from the untreated specimen at zero-contact time.

Other Fabric Properties: The fabric hand properties, i.e. resilience, softness and smoothness, were evaluated following procedures described in AATCC Test Method 202-2012. Tear strength tests of all the control and treated fabrics in warp and weft courses were performed according to procedures described in ISO 13937-2.

Results of antibacterial testing are shown below in Table 1.

TABLE 1

| Sample | Fabric | PHMB (%) | PEG-400 (%) | Binder (%) | Reduction %[a] SA | KP |
|---|---|---|---|---|---|---|
| Example 1 | Cotton | 5 | 5 | 3[b] | >99.9 | >99.9 |
| Example 2 | Cotton | 5 | 5 | 8[b] | >99.9 | >99.9 |
| Example 3 | Cotton | 5 | 10 | 5[c] | >99.9 | >99.9 |
| Example 4 | Cotton | 10 | 10 | 5[c] | >99.9 | >99.9 |
| Example 5 | Cotton | 10 | 5 | 8[c] | >99.9 | >99.9 |
| Example 6 | Cotton | 10 | 5 | 8[b] | >99.9 | >99.9 |
| Example 7 | Cotton | 15 | 5 | 8[c] | >99.9 | >99.9 |
| Example 8 | Cotton | 15 | 5 | 8[b] | >99.9 | >99.9 |
| Example 9 | Polypropylene | 5 | 5 | 8[b] | >99.9 | >99.9 |
| Example 10 | Polypropylene | 10 | 5 | 8[b] | >99.9 | >99.9 |

SA = *Streptococcus aureus*;
KP = *Klebsiella pneumoniae*
[a]The percentage reduction (R) of bacteria was calculated using:
$R = \frac{B-A}{B} \times 100$
where A = number of bacteria recovered from treated specimen after 18 hours;
B = number of bacteria recovered from the untreated specimen at zero-contact time;
[b]polyurethane;
[c]polyamine Table 1 shows results of quantitative testing for antibacterial activity in different fabric samples (cotton or polypropylene) treated with different antimicrobial coatings that include PHMB, PEG, and a binder compound (either polyurethane or polyamine). All the treated fabrics show significant antibacterial effects (>99.9% reduction) against both exemplary gram-positive and gram-negative bacterial species, indicating that such treated fabrics have substantially high, broad spectrum antibacterial effectiveness.

Dry pressing tests on the treated fabric were performed to determine the resistance of the antimicrobial finishes when subjected to hot pressing to mimic the dry ironing conditions under hospital settings. The ironed fabrics show significant antibacterial effects (>99.9% reduction) against both exemplary gram-positive and gram-negative bacterial species, indicating that the antimicrobial properties of treated cotton fabrics remain unchanged after hot pressing.

It should be appreciated that the treated fabrics of the inventive concept also have strong antibacterial properties against drug-resistant bacteria including Carbapenem-resistant *Escherichia coli* (CRE), multidrug-resistant *Acinetobacter baumannii* (MRAB) and Methicillin-resistant *Staphylococcus aureus* (MRSA). Such drug-resistant bacteria are often encountered in hospital acquired infections, and are difficult to treat. It is believed that the antimicrobial compositions and fabrics of the inventive concept target to cell surface structures of the pathogenic microbes (such as drug-resistant bacteria), leading to disruption of cell wall and/or membrane and subsequent cell death by mechanisms independent of such antibiotics. Results of testing for antimicrobial activity against representative drug-resistant bacterial strains are shown in Table 2. As shown, a treated cotton fabric of the inventive concept has a high degree of antimicrobial activity against all three exemplary drug-resistant bacteria, indicating that such coated fabrics are effective against a broad range of drug-resistant bacteria.

TABLE 2

| Sample | Reduction %[b] | | |
|---|---|---|---|
| | CRE | MRAB | MRSA |
| Treated Cotton Fabric[a] | >99.9 | >99.9 | >99.9 |

[a]The cotton fabric was coated with PHMB: 10% (v/v); PEG-400: 5% (v/v); polyurethane binder: 8% (v/v);
[b]The percentage reduction (R) of bacteria was calculated using:
$R = \frac{B-A}{B} \times 100$
where A = number of bacteria recovered from treated specimen after 18 hours;
B = number of bacteria recovered from the untreated specimen at zero-contact time.

Treated fabrics of the inventive concept can withstand multiple washings (at least 104 cycles of launderings) under stringent hospital washing conditions and maintain their antimicrobial properties. As shown in Table 3, treated fabrics of the inventive concept show significant bacterial reduction (>99.9%) for both drug-sensitive (SA and KP) and drug-resistant (CRE, MRAB, and MRSA) bacterial species, even after 104 cycles of laundering under two different stringent hospital washing conditions. This indicates that the antimicrobial coating is firmly coupled to the textile.

TABLE 3

| Species Exposed to Treated Cotton Fabric[a] | Reduction %[b] | |
|---|---|---|
| | Washing Condition I[c] | Washing Condition II[d] |
| SA | >99.9 | >99.9 |
| KP | >99.9 | >99.9 |
| CRE | >99.9 | >99.9 |
| MRAB | >99.9 | >99.9 |
| MRSA | >99.9 | >99.9 |

[a]The cotton fabric was coated with PHMB: 10% (v/v); PEG-400: 5% (v/v); polyurethane binder: 8% (v/v);
[b]The percentage reduction (R) of bacteria was calculated using
$R = \frac{B-A}{B} \times 100$
where A = number of bacteria recovered from treated specimen after 18 hours;
B = number of bacteria recovered from the untreated specimen at zero-contact time;
[c]Each washing cycle was performed at 65° C. for 10 min with detergent and hydrogen peroxide (300 ppm);
[d]Each washing cycle was performed at 75° C. for 5 min with detergent.

As noted above, compositions and fabrics of the inventive concept have antimicrobial activity against non-bacterial species, including fungal and viral pathogens. Anti-fungal activity was determined using the yeast *Candida albicans*, a common fungal pathogen. Fabric samples were cut into 25 mm×25 mm pieces and permeated with a fungal suspension (1×10$^6$ CFU/mL *Candida albicans*) in normal saline. After incubation for one hour at ambient temperature the soaked fabric samples were gently pressed onto Mueller-Hinton agar plates for 10 seconds. The fabric samples were then removed and the agar plates incubated at 35° C. overnight. Resulting colonies were counted to estimate colony-forming units (CFU) remaining on the fabric samples. As shown in Table 4, fabric treated with an antimicrobial composition of the inventive concept exhibits a strong and wash-durable antifungal effect against *Candida albicans* (CA), which is commonly found in community and healthcare environments. No observable growth of *Candida albicans* (i.e. a nearly 100% kill rate) was found for the treated cotton fabric before and after 104 stringent hospital washing cycles.

TABLE 4

| Sample | CA |
| --- | --- |
| Untreated Cotton Fabric | >200 CFU[b] |
| Treated Cotton Fabric[a] | No growth |
| Treated Cotton Fabric after 104 washing cycles[c] | No growth |

[a]The cotton fabric was coated with PHMB: 10% (v/v); PEG-400: 5% (v/v); and polyurethane binder; 8% (v/v);
[b]CFU = Colony forming unit;
[c]Each washing cycle was performed at 65° C. for 10 min with detergent and hydrogen peroxide (300 ppm).

Antimicrobial coating and treated fabrics of the inventive concept also have antiviral activities. Antiviral activity was evaluated using an H1N1 influenza virus (influenza A/HK/415742/P4-pdmH1N1). This strain has a TCDI$_{50}$ of approximately 10$^6$/mL. One hundred μL samples of this virus at the TCID$_{50}$ were directly added to samples of fabric (3 cm×3 cm) on a petri dish. A negative control was established in a separate petri dish. The fabric samples were incubated at ambient temperature. Viral transport medium (VTM; 0.9 mL) was added immediately (time point: 0) or after 10 min, 30 min, or 60 min, followed by expression of the fabric samples with a pair of forceps in order to recover the virus into the medium. The recovered virus samples from the test samples/negative control were then diluted for titration curve studies. Each sample was subjected to a series of 10-fold serial dilutions, and each dilution of the sample was added in triplicate (100 μL per well) to the wells of 96-well plates containing Madin-Darby canine kidney (MDCK) cells (approximately 10$^4$ cells per well). This was followed by 1-hour incubation. After washing with PBS once, the culture medium was replaced with Minimum Essential Medium (MEM) containing 2 μg/mL TPCK-trypsin. Cytopathic effects (CPE) were evaluated daily and TCID$_{50}$ was calculated on day 2 to 3. Table 5 shows that the antiviral activity of the treated cotton fabric against the influenza Type A H1N1 virus is sustained under stringent hospital laundering conditions. Such strong viricidal effects of a treated fabric (i.e. a TCID$_{50}$ reduction of 4 log$_{10}$ or more), particularly after 104 stringent hospital washing cycles, has not been reported previously.

TABLE 5

| | Washing | Log$_{10}$ TCID$_{50}$/ml (H1N1 pdm09)[d] | | |
| --- | --- | --- | --- | --- |
| Sample | Condition (104 cycles) | Recovered Immediately | 1-hour Incubation | Log$_{10}$ Reduction |
| Treated Cotton Fabric[a] | I[b] | 4.50 | 0.50 | 4.00 |
| Treated Cotton Fabric[a] | II[c] | 4.83 | 0.50 | 4.33 |

[a]The cotton fabric was coated with PHMB: 10% (v/v); PEG-400: 5% (v/v); polyurethane binder: 8% (v/v);
[b]Each washing cycle was performed at 65° C. for 10 min with detergent and hydrogen peroxide (300 ppm);
[c]Each washing cycle was performed at 75° C. for 5 min with detergent;
[d]TCID$_{50}$: median tissue culture infectious dose.

In addition to antimicrobial and antiviral properties of the treated fabrics, coating compositions of the inventive concept are capable of improving the tactile (e.g. hand feel) and/or mechanical (e.g. tear strength) properties of such treated textiles. Compared with the control fabric, the resilience, softness and smoothness of the treated fabric were maintained through at least 50 stringent hospital washings (see Table 6). Furthermore, the antimicrobial coating and treatment was found to have a substantial effect on the tearing strength of the treated fabric. As shown in Table 7, the tearing strength is increased by more than 40% relative to untreated fabric in both warp and weft directions after application of the antimicrobial coating.

TABLE 6

| Sample | Wash Cycles | Washing Condition | Resilience | Softness | Smoothness |
| --- | --- | --- | --- | --- | --- |
| Untreated Cotton Fabric | 0 | N/A | 45.21 | 69.98 | 83.07 |
| | 50 | I[b] | 48.39 | 71.63 | 81.73 |
| | 50 | II[c] | 50.14 | 70.98 | 81.22 |
| Treated Cotton Fabric[a] | 0 | N/A | 46.50 | 71.27 | 83.02 |
| | 50 | I[b] | 48.93 | 70.45 | 82.16 |
| | 50 | II[c] | 49.44 | 72.32 | 80.43 |

[a]The cotton fabric was coated with PHMB: 10% (v/v); PEG-400: 5% (v/v); polyurethane binder: 8% (v/v);
[b]Each washing cycle was performed at 65° C. for 10 min with detergent and hydrogen peroxide (300 ppm);
[c]Each washing cycle was performed at 75° C. for 5 min with detergent.

TABLE 7

| | Average Load at Average Value (5 Peaks) (N) | |
| --- | --- | --- |
| Sample | Warp Direction | Weft Direction |
| Untreated Cotton Fabrics | 7.58 | 7.84 |
| Treated Cotton Fabrics[a] | 13.0 | 15.0 |

[a]The cotton fabric was coated with PHMB: 10% (v/v); PEG-400: 5% (v/v); polyurethane binder: 8% (v/v).

Treated fabrics of the inventive concept can withstand multiple washings (at least 104 cycles of launderings) under stringent hospital washing conditions and maintain their antimicrobial properties, indicating that the antimicrobial coating is firmly coupled to the textile substrate. Such wash-durable fabrics with enhanced antimicrobial and antiviral activity, hand feel and tearing strength are well-suited for widespread use in healthcare and hospital environments, as well as other group care environments where antimicrobial activity is desirable.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A wash-durable antimicrobial textile, comprising:
a textile substrate; and
an antimicrobial composition comprising 5% to 15% v/v polyhexamethylene biguanide, 5% to 10% v/v polyethylene glycol having a molecular weight of 300 Daltons to 1,000 Daltons, and 3% to 8% v/v of a binder,
wherein at least a portion of the antimicrobial composition is chemically bonded to the to the textile substrate, and wherein the wash-durable antimicrobial textile exhibits antibacterial, antiviral, and antifungal properties.

2. The wash-durable antimicrobial textile of claim 1, wherein antibacterial, antiviral, and antifungal properties are maintained after at least 104 cycles of washing performed in accordance with a stringent hospital protocol for hygienic washing, wherein the hospital protocol for hygienic washing is selected from the group consisting of (1) agitation at 65° C. with detergent and oxygen-based disinfectant for 10 minutes, and (2) agitation at 75° C. with detergent for 5 minutes.

3. The wash-durable antimicrobial textile, wherein at least one of tearing strength, resilience, softness, and smoothness of the wash-durable antimicrobial textile is increased relative to the textile substrate alone.

4. A method of providing a wash-durable antimicrobial textile of claim 1, comprising:
obtaining a textile substrate;
contacting the textile substrate with an antimicrobial composition cationic of claim 1;
allowing the antimicrobial composition to dry to generate a treated textile substrate; and curing the treated textile substrate.

5. The method of claim 4, wherein contacting with the antimicrobial composition is performed by application of a coating of the antimicrobial composition to the textile substrate using a pad-dry-cure method.

6. The method of claim 5, wherein the pad-cure-dry method comprises dipping and padding the textile substrate with the antimicrobial composition, drying is performed at ambient temperature until a wet pick-up of 70% to 80% is achieved followed by exposure to a first temperature of about 90° C. for 1 to 10 minutes, and curing is performed by exposure a second temperature of about 120° C. to about 140° C. for 30 seconds to 1 minute.

7. An article of clothing having anti-microbial properties, comprising:
a textile comprising a cellulosic or synthetic polymer fiber coated with an antimicrobial composition, wherein the antimicrobial composition comprises comprising 5% to 15% v/v polyhexamethylene biguanide, 5% to 10% v/v polyethylene glycol having a molecular weight of 300 Daltons to 1.000 Daltons, and 3% to 8% v/v of a binder,
wherein at least a portion of the antimicrobial composition is chemically bonded to the to the textile, and wherein the article of clothing exhibits antibacterial, antiviral, and antifungal properties.

8. The article of clothing of claim 7, wherein the article of clothing is selected from the group consisting of a shoe, a slipper, a stocking, underwear, a cloth diaper, a support garment, pants, a dress, a skirt, a shirt, a laboratory or medical practitioner's coat, pajamas, a hat, a headscarf, and a glove.

9. The article of clothing of claim 7, wherein the antibacterial, the antiviral, and the antifungal properties are maintained after at least 104 cycles of washing of the article of clothing performed in accordance with a stringent hospital protocol for hygienic washing, wherein the hospital protocol for hygienic washing is selected from the group consisting of (1) agitation at 65° C. with detergent and oxygen-based disinfectant for 10 minutes, and (2) agitation at 75° C. with detergent for 5 minutes.

* * * * *